United States Patent [19]

Young

[11] Patent Number: 5,329,917
[45] Date of Patent: Jul. 19, 1994

[54] FIRE RING

[76] Inventor: David C. Young, 2331 N. 42nd St., Grand Forks, N. Dak. 58203

[21] Appl. No.: 40,125

[22] Filed: Mar. 30, 1993

[51] Int. Cl.⁵ ............................................... F24P 3/00
[52] U.S. Cl. ........................................ 126/29; 126/30; 126/9 R; 126/9 B
[58] Field of Search ............... 126/9 R, 9 B, 29, 30, 126/25 R, 59

[56] References Cited

U.S. PATENT DOCUMENTS

| | | | |
|---|---|---|---|
| 146,226 | 1/1874 | Brewer | 126/30 |
| 915,239 | 3/1909 | Stapp | 126/9 B |
| 955,140 | 4/1910 | Cronk | 126/30 |
| 1,194,131 | 8/1916 | Brown | 126/29 |
| 1,502,837 | 7/1924 | Martin | 126/9 R |
| 1,622,176 | 3/1927 | Bishop | 126/29 |
| 2,469,698 | 5/1949 | Morgan | 126/9 R X |
| 4,363,313 | 12/1982 | Smith | 126/30 X |
| 4,829,977 | 5/1989 | Valentine | 126/30 X |
| 4,896,650 | 1/1990 | Hait | 126/9 B X |

Primary Examiner—Carl D. Price
Attorney, Agent, or Firm—Zarley, McKee, Thomte Voorhees & Sease

[57] ABSTRACT

A portable fire ring comprises a plurality of curved sections which are secured together in an end-to-end relationship to form a semi-circle. A grill extension is then assembled and connected to the ends of the semi-circle. A pivotal grill extends over the grill extension to permit the fire chamber of the grill section to be opened to enable coals to be placed in the fire chamber. Disassembled, the fire ring may be lifted and moved to the desired position or moved to a new location. The portable fire ring is easily assembled and disassembled and may be carried in a bag or the like when disassembled.

2 Claims, 4 Drawing Sheets

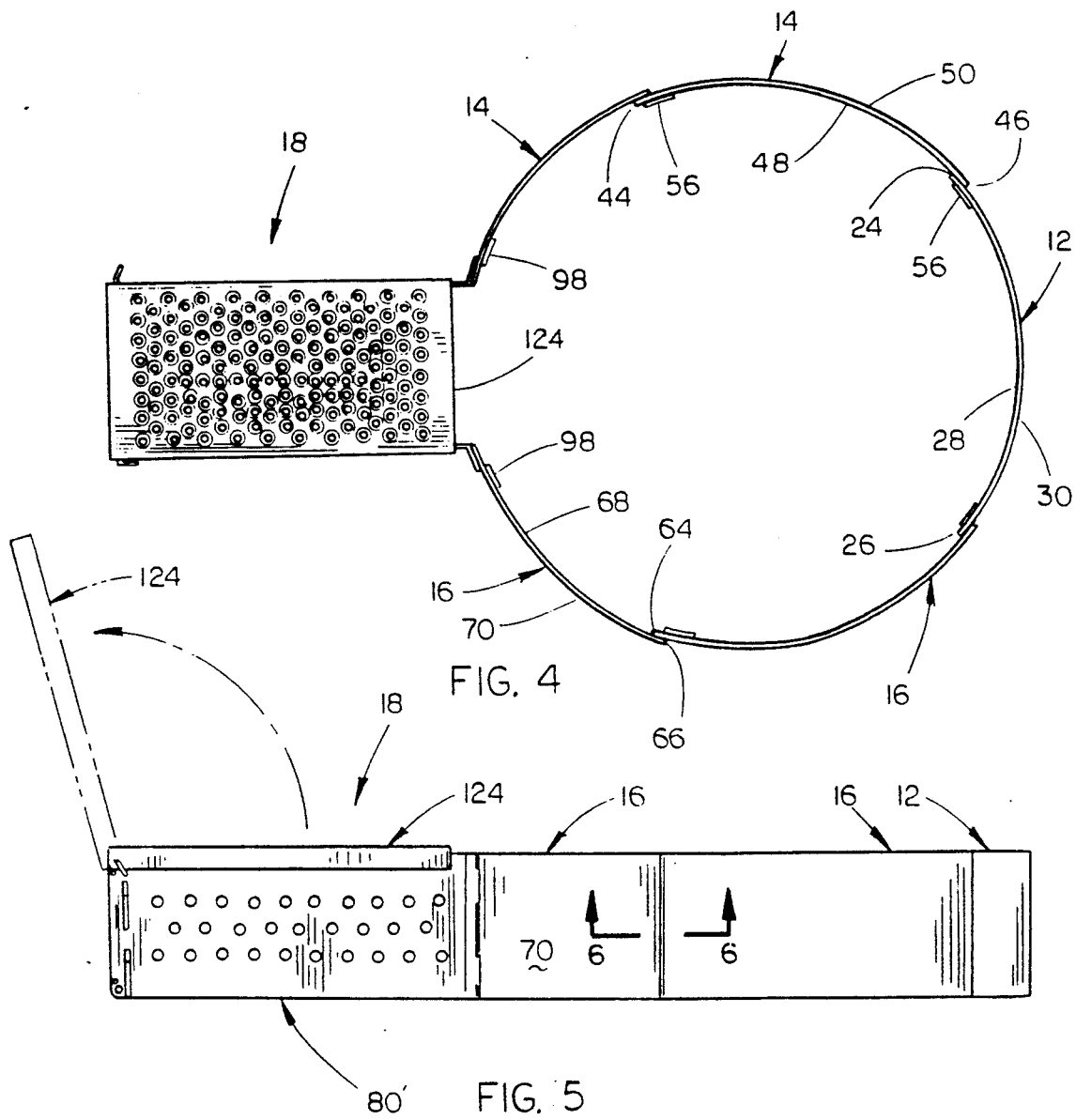
FIG. 4
FIG. 5
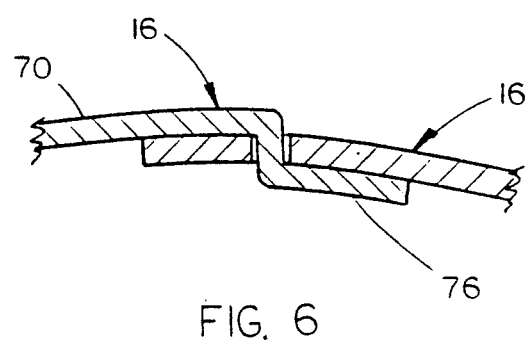
FIG. 6

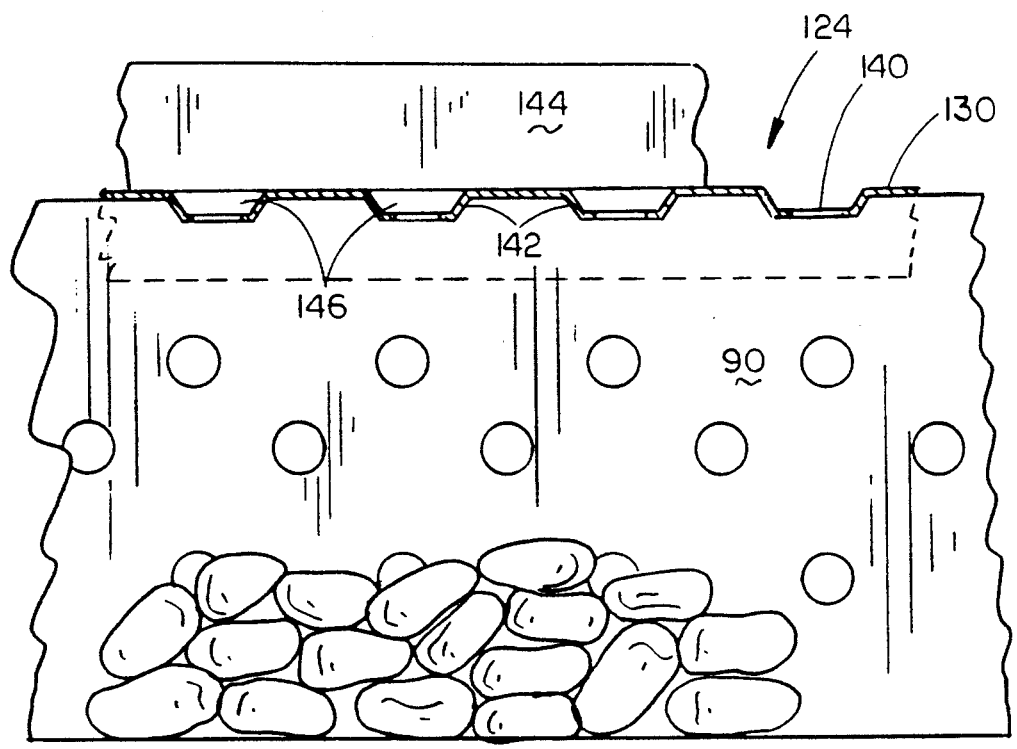
FIG. 7
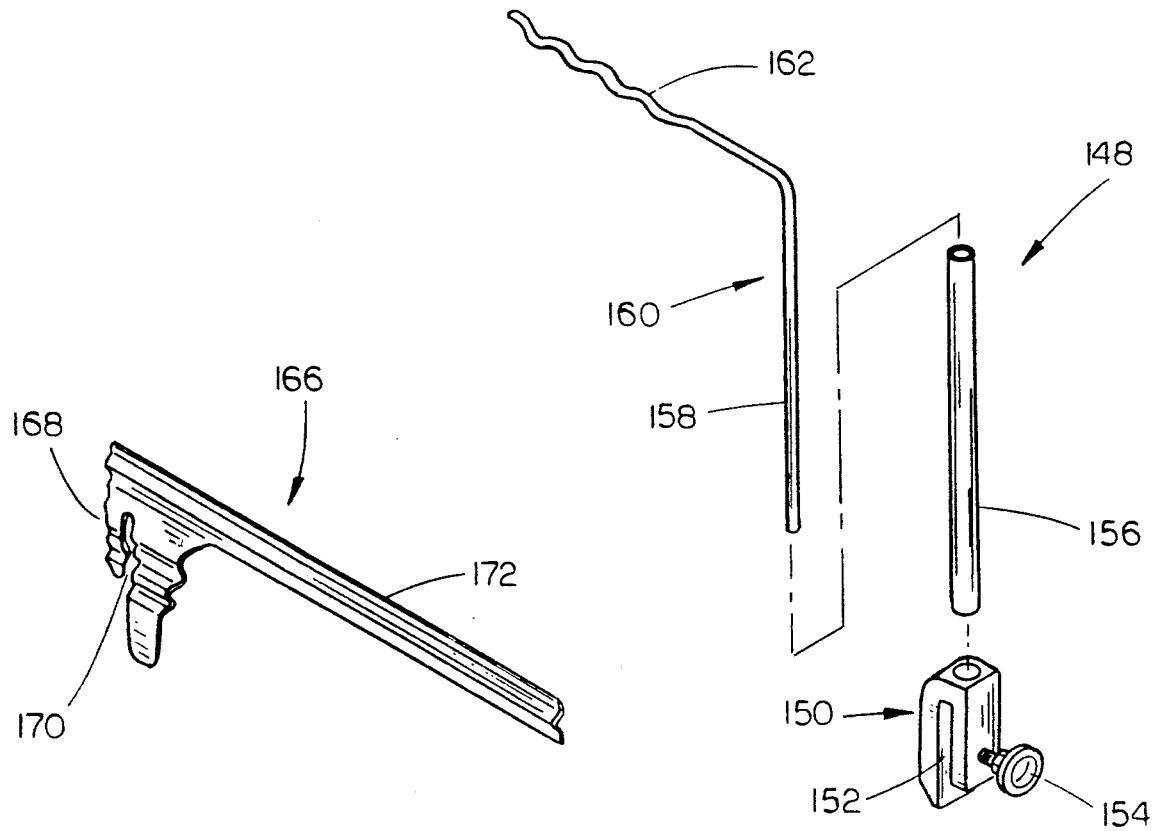
FIG. 8
FIG. 9

FIRE RING

BACKGROUND OF THE INVENTION

1. Field of the Invention

This invention relates to a fire ring and more particularly to a portable fire ring for surrounding a campfire.

2. Description of the Related Art

Traditionally, a circle of rocks has been used to surround a campfire. The circle of rocks provides protection for the fire from the effects of the wind, and also serves to furnish support for cooking utensils. The fire rings constructed of rocks afford slight protection from the wind, are slow to set up, and difficult to cook over. Gathering scattered rocks may disturb the natural landscape around the campsite. This undesirable aspect, coupled with the fact that finding and lugging rocks back to the campsite is hard work, makes for an inefficient means of campfire protection. Further, rocks rocks normally cannot be found in uniform sizes to provide even, level support for pots and pans, creating problems in the cooking process. Though uncommon, there may be dangers involved with using rocks. A porous, waterlogged rock may explode as it heats up, thereby possibly causing bodily injury.

Permanent metal fire rings are becoming more widely used, both for convenience and safety. Some are simple rings, some have attached cooking grills that either flip over for grilling, or swing to the side. Because the permanent metal fire rings are designed to be permanent, they obviously are not practical to carry from campsite to campsite. Further, permanent metal rings generally have poor cooking surfaces which lower their utility for food preparation.

DESCRIPTION OF THE DRAWINGS

FIG. 4 is a top view of the fire ring of this invention;

FIG. 5 is a side view of the fire ring of this invention illustrating the cooking grill having been pivotally moved up from its cooking position;

FIG. 6 is an enlarged sectional view as seen in lines 6—6 of FIG. 5;

FIG. 7 is an enlarged sectional view seen on lines 7—7 of FIG. 1;

FIG. 8 is a perspective view of one of the support brackets of an accessory for supporting pots and pans; and FIG. 9 is an exploded perspective view of another accessory which is designed for use with the fire ring of this invention.

SUMMARY OF THE INVENTION

Figure 1:
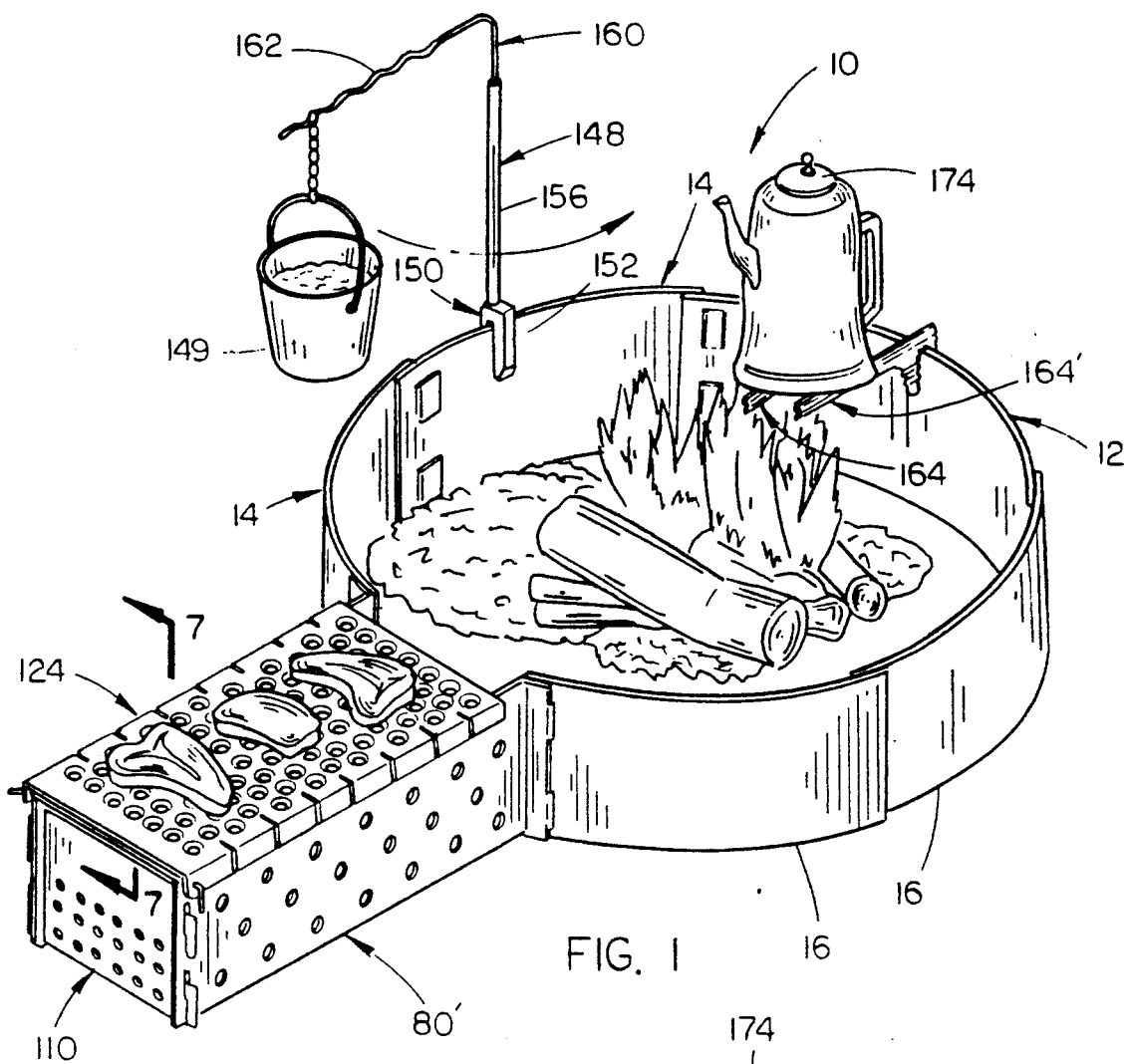
FIG. 1 is a perspective view of the fire ring of this invention.

A portable fire ring is disclosed which is comprised of one curved ring section with slots at both ends, four curved sections with slots at one end and tabs at the other end, two straight grill extension sections, one end gate, a grill, and a hinge pin. The curved ring sections are connected together in an end-to-end relationship so that the five curved sections form a semi-circle. The two straight grill extension sections are then added to the ring and pulled parallel to allow the end gate to be inserted into the outer ends of the straight grill extension sections. The grill is then pivotally secured to the upper end of the grill extension sections. Due to the interlocking features of the sections, the assembled ring may be lifted for positioning, or moved to a new location without disassembly if desired.

A fire may be built in the circular part of the ring. As the fire burns down, the grill is pivotally opened to expose the fire chamber of the grill extension. Coals from the fire are then moved from the circular part of the ring into the fire chamber of the grill extension. The grill is then lowered so that meat or the like may be placed on the grill. Accessories for the fire ring are also disclosed for supporting pots and pans thereon.

It is therefore a principal object of the invention to provide an improved portable fire ring.

Still another object of the invention is to provide a portable fire ring which may be quickly assembled and quickly disassembled.

Still another object of the invention is to provide a portable fire ring which, when assembled, may be lifted for positioning, or moved to a new location without disassembly.

Still another object of the invention is to provide a portable fire ring including a novel cooking grill which adds strength to the grill and which also enhances grease drainage as well as enhancing the cooking of the food on the grill.

Still another object of the invention is to provide a portable fire ring which may be easily disassembled and carried in a suitable carrying case. Still another object of the invention is to provide a portable fire ring having a unique key hole grill extension.

These and other objects of the present invention will be apparent to those skilled in the art.

DESCRIPTION OF THE PREFERRED EMBODIMENT

The portable fire ring of this invention is referred to generally by the reference numeral 10. Fire ring 10 is comprised of a first curved ring section 12, a plurality of second curved ring sections 14, a plurality of third curved ring sections 16, and a grill extension 18. Preferably, the sections 12, 14 and 16 are constructed of a steel material and have a height of 6.75 inches. Preferably, the fire ring has a diameter of approximately 30 inches when assembled but that dimension may vary depending upon the wishes of the end user. It should be noted that the ring sections 14 and 16 are identical but are described as second and third ring sections for ease of description. It should also be noted that the fire ring 10 could be constructed without the grill extension 18 if desired although it is preferred that the fire ring include the grill extension 18. If the fire ring were to be constructed without a grill extension, ring section 12 would have tabs at one end thereof and slots at the other end thereof rather than slots at both ends as illustrated.

Ring section 12 is curved as stated and has a top edge 20, bottom edge 22, opposite ends 24 and 26, inner surface 28, and outer surface 30. A pair of vertically disposed slots 32 and 34 are formed in ring section 12 adjacent end 24 and a pair of vertically disposed slots 36 and 38 are formed in ring section 12 adjacent end 26.

Each ring section 14 includes a top edge 40, bottom edge 42, opposite ends 44 and 46, inner surface 48, and outer surface 50. Each ring section 14 has a pair of vertically disposed slots 52 and 54 formed therein adjacent end 44. Each ring section 14 has a pair of vertically spaced offset tabs 56 and 58 extending from end 46 which are adapted to be received by either the slots 32 and 34 of ring section 12 or the slots 52 and 54 of the adjacent ring section 14.

Although the ring sections 16 are identical to the fire ring sections, for ease of explanation of the assembly of the fire ring 10, each ring section 16 will be described as including an upper edge 60, a bottom edge 62, opposite ends 64 and 66, inner surface 68 and outer surface 70. Each ring section 16 has a pair of vertically disposed slots 72 and 74 formed therein adjacent end 64 and has a pair of vertically spaced, offset tabs 76 and 78 extending from end 66. Tabs 76 and 78 are adapted to either be received by the slots 36 and 38 in ring section 12 or the slots 72 and 74 in the adjacent ring section 16.

The length and curvature of the ring sections 12, 14 and 16, as well as the number of ring sections 14 and 16, will depend upon the desired diameter of the fire ring 10.

Grill extension 18 includes identical straight extension sections 80 and 80'. Inasmuch as the sections 80 and 80' are identical, only section 80 will be described in detail with "'" indicating identical structure on section 80'.

Figure 3:
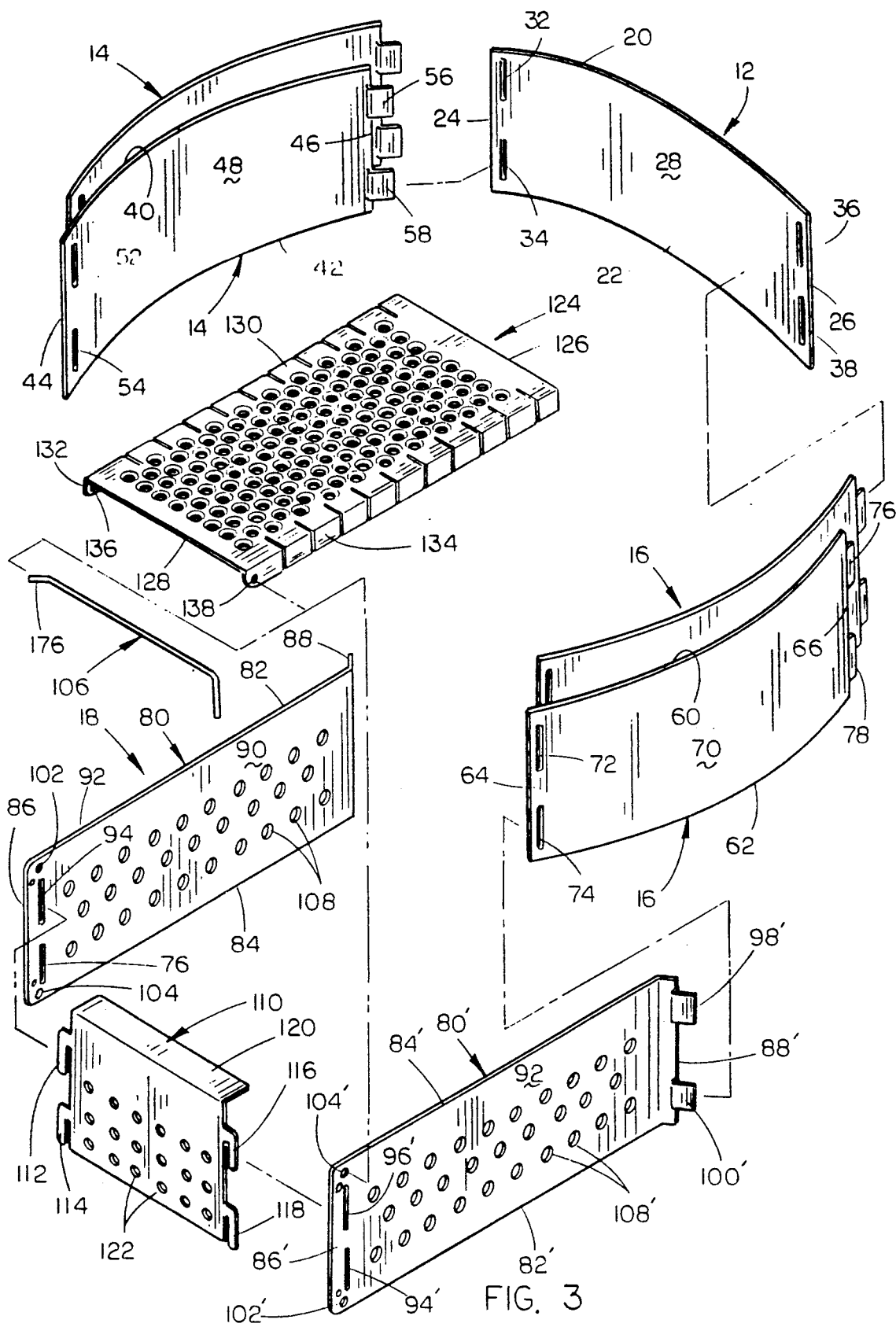
FIG. 3 is an exploded perspective view of the fire ring of this invention.

Extension section 80 includes opposite edges 82 and 84, opposite ends 86 and 88, and opposite surfaces 90 and 92. Section 80 is provided with a pair of vertically disposed slots 94 and 96 formed therein adjacent end 86 and has a pair of tabs 98 and 100 (not shown) extending from the end 88 of the section. As seen in FIG. 3, the end 88 of the section 80 is offset to facilitate assembly and disassembly. Section 80 is also provided with openings 102 and 104 formed therein adapted to receive hinge pin 106 extending therethrough. When sections 18 and 18' are positioned as seen in FIG. 3, hinge pin 106 extends through openings 102 and 104'. If the position of sections 80 and 80' is reversed, the hinge pin 106 extends through openings 102' and 104. A plurality of openings 108 extend through section 18 to permit the passage of air therethrough.

End gate 110 is adapted to be connected to the outer ends 86 and 86' of sections 18 and 18' by means of the tabs 112, 114, 116 and 118 being received by the slots 94, 96, 96' and 94' respectively. As seen in FIG. 3, end gate 110 has a horizontally disposed lip 120 at its upper end which extends inwardly towards the fire ring. As also seen in FIG. 3, end gate 110 has openings 122 extending therethrough to allow the flow of air therethrough.

Grill 124 is adapted to be positioned over the sections 80, 80' and end gate 110 to permit meat or the like to be grilled thereon. Preferably, grill 124 is nickel plated. Grill 124 includes an inner end 126, outer end 128, top surface 130, and downwardly extending side portions 132 and 134. The outer ends of the side portions have hinge pin openings 136 and 138 formed therein to receive the hinge pin 106 therein. A plurality of openings 140 are formed in grill 124 as best seen in FIG. 7. The openings 140 are pierced and formed downwardly to provide the conical-shaped wall 142 extending upwardly therefrom to the top surface 130. The configuration of the openings 140 and walls 142 provide increased strength for the grill 124 and enhance grease drainage from the top surface 130. Further, as seen in FIG. 7, when a piece of meat 144 is placed on the grill 14, small pockets or compartments 146 are present beneath the lower surface of the meat and the openings 140 which seems to enhance the cooking action of the meat.

An accessory for the fire ring 10 is illustrated in FIGS. 1 and 9. In FIG. 1 and 9, the numeral 148 refers to a support for heating water in containers 149 or the like. Support 148 includes a clamp 150 having a vertically disposed slot 152 formed therein which is adapted to receive the upper edge of one of the ring sections. Screw 154 is threadably mounted in clamp 150 with its inner end adapted to engage the ring section to secure the clamp 150 to the ring section. Tubular member 156 is removably mounted on clamp 150 and extends upwardly therefrom. A vertically disposed portion 158 of support 160 is removably received in the upper end of tubular member 158 as seen in FIG. 9. The horizontally disposed portion 162 of support 160 is designed to support the container in the fashion illustrated in FIG. 1. As seen in FIG. 1, the horizontally disposed portion 162 may be swung over the fire ring to heat the water in the container 149.

FIG. 1 and 8 illustrate another accessory for the fire ring which may be used to support pots or pans thereon. The accessory is identified by the reference numeral 164 and is comprised of a pair of ribbed brackets 166 and 166'. Inasmuch as brackets 166 and 166' are identical, only bracket 166 will be described in detail. Bracket 166 includes a base portion 168 having a slot 170 formed therein for receiving the upper edge of one of the ring sections. Bracket 166 also includes a horizontally disposed portion 172 adapted to support a pot or pan 174 thereon as illustrated in FIG. 1.

Figure 2:
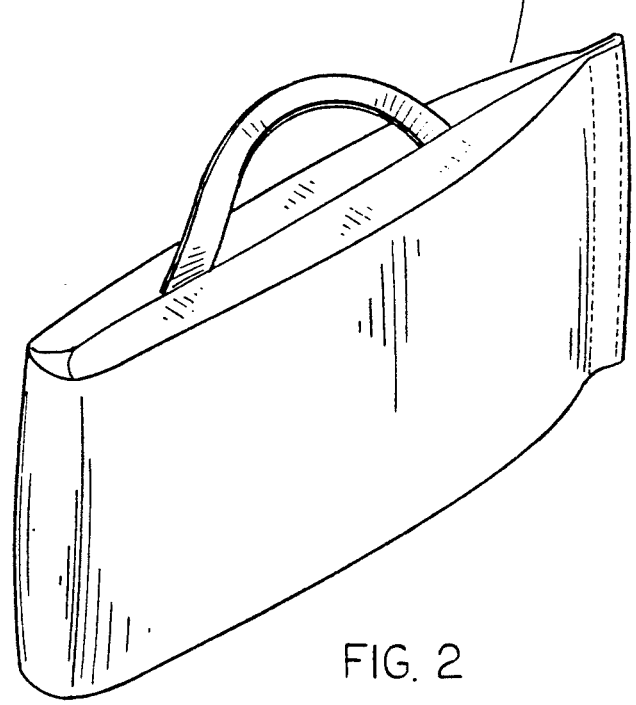
FIG. 2 is a perspective view illustrating the fire ring having been disassembled and stored in a bag for transportation to another campsite.

The fire ring 10 of this invention is normally disassembled and may be carried in the carrying case 74 illustrated in FIG. 2. If it is desired to assemble the fire ring, the ring section 12 is positioned as illustrated in FIG. 1. Ring section 14 is connected to the end 24 of ring section 12 by inserting the tabs 56 and 58 into the slots 32 and 34 as illustrated in the drawings. A second ring section 14 is then connected to the end 44 of the section 14 which has been secured to the ring section 12 by inserting the tabs 56 and 58 of that ring section into the slots 52 and 54 of the adjacent ring section 14. A ring section 14 is then secured to the end 26 of ring section 12 by inserting the tabs 76 and 78 into the slots 36 and 38 as illustrated in the drawings. The second ring section 14 is then connected to the end 64 of the ring section 16 which has been secured to the end of the ring section 12. The assembled ring sections 12, 14 and 16 form a semi-circle.

An alternative way of assembling the fire ring into the semi-circle shape is to first position the ring section 12 and assemble all of the ring sections 14 and 16 from either end of the ring section 12 in either a left or right fashion. Regardless of whether the fire ring is assembled as illustrated in the drawings or as that just described, the resulting semi-circular fire ring will end up with slots at the ends of the fire ring so that the tabs of the sections 80 and 80' may be inserted thereinto. The end gate 110 is then inserted into the slots at the ends of the extension sections 80 and 80' as previously described.

The grill may now be placed in position, the hinge pin 106 inserted through opening 138 in grill 124, opening 104' in section 80' and opening 102 in extension section 80. It is suggested that the pin 106 be inserted through the grill 20 with the bend 76 thereon pointing up. Once the hinge pin 106 has been inserted as described, the pin is rotated so that the bend 176 is pointed downward to lock the grill and all other parts together. The fire ring 10 is now interlocked and ready to use.

A fire may now be built in the circular part of the ring. A good practice to remember is to always point the grill extension into the prevailing wind. This allows air to move across the coals and keep them burning, and will move heat and smoke away from the individual who is cooking. As the fire burns down, grill 124 is pivotally moved upwardly with respect to the extension sections 80 and 80' to open the fire chamber of the grill extension. Coals from the fire ring are then raked into the extension and spread evenly. The grill 124 is then lowered so that a piece of meat 144 or the like may be placed thereon as illustrated in FIG. 7. As described, the conical-shape of the grill adjacent the openings 140 facilitate grease drainage from the grill and creates the small compartments 146 between the meat 144 and the openings 140 which seems to enhance the cooking of the meat. Further, the design of the holes enhances the strength of the grill.

The support 148 may be removably attached to the upper edge of one of the ring sections so that the container 148 may be positioned over the fire to heat the contents thereof. The brackets 164 and 164' may be attached to the upper edge of one of the ring sections so as to permit a pot 174 to be positioned over the fire for heating the contents thereof.

The fire ring 10 of this invention is disassembled as follows. The hinge pin 106 is rotated so that the end 176 is pointing upward. Hinge pin 106 is then removed from the grill extension to permit the end gate 110 to be disconnected from the outer ends of the sections 80 and 80'. Sections 80 and 80' are then disconnected from the associated curved ring sections. The curved ring sections are then disconnected from one another. The components of the fire ring are then placed in the bag 174 for storage and/or transport.

Thus it can be seen that a unique portable fire ring has been described which accomplishes at least all of its stated objectives.

I claim:

1. A portable fire ring, comprising:
   a first curved ring section having an upper edge, lower edge, and opposite ends,
   a pair of second curved ring sections removably connected together in an end-to-end relationship and removably connected to one end of said first curved ring section, each of said ring sections having an upper edge, a lower edge, a first end and a second end;
   a pair of third curved ring sections removably connected together in an end-to-end relationship and removably connected to the other end of said first curved ring section, each of said third ring sections having an upper edge, a lower edge, a first end and a second end,
   said first, second and third ring sections defining a partial circle with the second end of the end-most second ring section being spaced from the second end of the endmost third ring section;
   first and second straight grill sections having an upper edge, a lower edge, and opposite ends,
   one end of said first grill section being removably secured to the second end of the end-most second ring section and extending outwardly therefrom,
   one end of said second grill section being removably secured to the second end of the end-most third ring section and extending outwardly therefrom parallel to said first grill section in a spaced-apart relationship thereto.
   and an end gate having an upper edge, lower edge, and opposite ends;
   one end of said end gate being secured to the other end of said first grill section, the other end of said end gate being secured to the other end of said second grill section;
   a normally horizontally disposed grill positioned on the upper edges of said first and second grill sections and the upper edge of said end gate,
   said grill being pivotally mounted with respect to said grill sections to enable said grill to be pivotally raised with respect thereto.

2. A portable fire ring, comprising:
   a first curved ring section having an upper edge, lower edge, and opposite ends,
   a pair of second curved ring sections removably connected together in an end-to-end relationship and removably connected to one end of said first curved ring section, each of said ring sections having an upper edge, a lower edge, a first end and a second end;
   a pair of third curved ring sections removably connected together in an end-to-end relationship and removably connected to the other end of said first curved ring section, each of said third ring sections having an upper edge, a lower edge, a first end and a second end,
   said first, second and third ring sections defining a partial circle with the second end of the end-most second ring section being spaced from the second end of the endmost third ring section;
   first and second straight grill sections having an upper edge, a lower edge, and opposite ends,
   one end of said first grill section being removably secured to the second end of the end-most second ring section and extending outwardly therefrom,
   one end of said second grill section being removably secured to the second end of the end-most third ring section and extending outwardly therefrom parallel to said first grill section in a spaced-apart relationship thereto,
   and an end gate having an upper edge, lower edge, and opposite ends;
   one end of said end gate being secured to the other end of said first grill section, the other end of said end gate being secured to the other end of said second grill section;
   a normally horizontally disposed grill positioned on the upper edges of said first and second grill sections and the upper edge of said end gate,
   said grill having a plurality of inverted conical-shaped recessed areas formed therein;
   each of said recessed areas having an upper end and a lower end, each of said conical-shaped recessed areas having an opening provided therein at its lower end, the diameter of the opening gin each recessed area being less than the diameter of the upper end of the recessed area.

* * * * *